US010166565B2

(12) United States Patent
Lemkin

(10) Patent No.: US 10,166,565 B2
(45) Date of Patent: Jan. 1, 2019

(54) IRRIGATION MONITORING SYSTEM AND METHOD FOR MONITORING FLOW RATE INTO IRRIGATION SYSTEM TO DETERMINE THE EXISTENCE OR ABSENCE OF AN IRRIGATION FAULT

(71) Applicant: Mark Alan Lemkin, Berkeley, CA (US)

(72) Inventor: Mark Alan Lemkin, Berkeley, CA (US)

( * ) Notice: Subject to any disclaimer, the term of this patent is extended or adjusted under 35 U.S.C. 154(b) by 48 days.

(21) Appl. No.: 15/360,923

(22) Filed: Nov. 23, 2016

(65) Prior Publication Data

US 2018/0141069 A1 May 24, 2018

(51) Int. Cl.
| | |
|---|---|
| *G05D 11/00* | (2006.01) |
| *G05D 9/00* | (2006.01) |
| *G05D 7/00* | (2006.01) |
| *B05B 12/08* | (2006.01) |
| *B05B 12/00* | (2018.01) |
| *G05D 7/06* | (2006.01) |
| *A01G 25/16* | (2006.01) |

(52) U.S. Cl.
CPC .......... *B05B 12/085* (2013.01); *A01G 25/167* (2013.01); *B05B 12/006* (2013.01); *G05D 7/0676* (2013.01)

(58) Field of Classification Search
CPC ........................................... A01G 25/16
USPC ........................................... 700/284
See application file for complete search history.

(56) References Cited

U.S. PATENT DOCUMENTS

| | | | | |
|---|---|---|---|---|
| 5,479,338 | A * | 12/1995 | Ericksen ............... | A01G 25/16 137/624.2 |
| 7,412,876 | B2 * | 8/2008 | Kates .................. | G01M 3/2815 73/40 |
| 7,900,647 | B2 | 3/2011 | Tornay | |
| 2005/0126635 | A1 * | 6/2005 | Addink ............... | G05D 7/0635 137/487.5 |
| 2014/0200836 | A1 * | 7/2014 | Lee ..................... | G01F 1/34 702/47 |
| 2014/0365021 | A1 * | 12/2014 | Workman ............. | A01G 25/16 700/284 |
| 2015/0051743 | A1 * | 2/2015 | Darnold ............... | A01G 25/16 700/284 |
| 2015/0319941 | A1 | 11/2015 | Rachio | |
| 2016/0335875 | A1 | 11/2016 | Rachio | |

(Continued)

OTHER PUBLICATIONS

U.S. Appl. No. 62/332,199, filed May 5, 2016 Applicant: Rachio, Inc. First Inventor: Christopher Michael Klein.

(Continued)

*Primary Examiner* — Suresh Suryawanshi

(57) ABSTRACT

A method and device for monitoring an irrigation system is provided. The device includes a flow sensor and an irrigation controller comprising at least two outputs. The irrigation monitor is coupled to the irrigation controller and the flow sensor and performs an action in response to detecting a fault condition. The method includes steps of measuring flow through an irrigation feed, determining an intended state of an irrigation valve, associating the measured flow with the intended valve state, and detecting a fault condition. In some examples the irrigation monitor and irrigation controller use a single processor.

20 Claims, 12 Drawing Sheets

(56) References Cited

U.S. PATENT DOCUMENTS

2017/0052522 A1    2/2017  Rachio

OTHER PUBLICATIONS

U.S. Appl. No. 62/352,855, filed Jun. 21, 2016 Applicant: Rachio, Inc. First Inventor: Christopher Michael Klein.
U.S. Appl. No. 62/373,686, filed Aug. 11, 2016 Applicant: Rachio, Inc. First Inventor: Christopher Michael Klein.
Hunter, "ICORE Commercial Irrigation Controller," Owner's manual and installation instructions, Mar. 2011.
Hunter, "Flow Click Flow Sensor," Owner's manual and installation instructions, Jan. 2003.
Hunter, "Flow Sync," Owner's manual and installation instructions, Apr. 2013.
Hunter, "Wireless Flow Sensor," Owner's manual and installation instructions, Nov. 2016.

* cited by examiner

IRRIGATION MONITORING SYSTEM AND METHOD FOR MONITORING FLOW RATE INTO IRRIGATION SYSTEM TO DETERMINE THE EXISTENCE OR ABSENCE OF AN IRRIGATION FAULT

TECHNICAL FIELD

This disclosure generally relates to the electrical and mechanical arts, and more particularly to irrigation systems.

DESCRIPTION OF RELATED ART

Conventional irrigation systems operate based on a schedule, opening and closing irrigation valves controlling multiple irrigation zones according to this schedule. Some conventional irrigation systems modify the schedule based upon weather or precipitation to provide an amount of water more closely in tune with the needs of the irrigated zone. For various reasons, many irrigation systems are broken into multiple zones where a single irrigation controller is responsible for opening and closing multiple valves electrically. The valves are usually solenoid-actuated and control the flow from a water main that supplies water for the irrigation system (e.g. irrigation feed), with the individual valves controlling flow from the irrigation feed to individual zones as controlled by the irrigation controller.

SUMMARY

The teachings herein provide for systems and methods having improved irrigation performance by monitoring the output from an irrigation controller, monitoring the flow rate into the irrigation system, and operating on these inputs to determine the existence or absence of an irrigation fault.

Conventional irrigation systems operate open-loop meaning the irrigation is carried out on a schedule specified by an amount of time the valves should remain open. Open-loop irrigation is disadvantageous due to the lack of insight into the actual flow and total water delivered. Irrigation systems are typically subject to a large number of failure modes that may occur without notice until large expenses have already been incurred (e.g. death or injury of plants due to insufficient or excess water delivery; a large water bill due to excess irrigation.) Failure modes are exacerbated by the substantial stresses induced by weather and ultraviolet radiation from sunlight. The following list includes a sample of some potential failure modes in irrigation systems, and is not intended to be all-inclusive:

TABLE 1

Common Irrigation Failure Modes

Pipe break
Malfunctioning valve
Drip line damage caused by line trimmers.
Sprinkler head clogged
Sprinkler head damaged by lawnmower
Emitters or line disconnection due to tripping or digging from people or animals
Chewing animals resulting in leaks, excess watering, or damaged emitters
Clogged emitters resulting in a reduced flow of water
Valves don't turn off due to a flow rate that is too low
Valves don't turn on due to a poor electrical connection (shorts/opens due to grease caps)
Tampering with irrigation settings
Damage due to freezing or improper weatherization
Stuck solenoid A user generally doesn't know about an irrigation system failure to water until plants have died and/or shown signs of water stress, which can be too late since water stress can damage or weaken plants. Many irrigation leaks are only discovered when the next water bill arrives, at which point much water has been wasted and charges already accrued. In many localities invoices for water service are processed only every 3 months—thus wasted water may continue for three months before even being noticed at which point a repair needs to be scheduled and performed. Irrigation systems that operate without close attention to irrigation performance and/or frequent inspections (e.g. parks, city developments, schools, buildings etc.) are particularly susceptible to operation under a failure condition since the system owner or user may not be aware of irrigation failures unless they are there when the zone is actively being watered. In the open-loop irrigation case it is difficult to know where a leak is in the system even once a leak is inferred from a large water bill. In residential installations, given solely the information that excess water was used during a billing period, it isn't clear if an irrigation leak was intermittent (intermittently-sticky valve stuck open—could spend hours trying to isolate to no avail), permanent, or even what zone the leak is in; it can be very cumbersome to determine root-cause after the fact when presented with a large water bill. A large water bill due to leaks isn't even necessarily from irrigation in a residential system—the root cause could be a water-service leak, leaky appliances or toilets, or any other leak not associated with the irrigation system. Thus, investigation of excess water consumption is only initiated when a large water bill is received, and can be very time consuming. In some embodiments an irrigation monitor provides information that may be used to infer whether a suspected leak is in the irrigation system or internal to a house (e.g. the irrigation system is performing normally, thus appliances internal to a house should be checked such as toilets and sinks.) saving the user substantial time, effort and/or cost.

For some users irrigation scheduling using time is nonintuitive; many people find it easier to conceptualize water as a volume, for example gallons or liters, since a gallon of milk or water is a common unit of measure of which people are familiar. Poor intuition of delivered water volume often leads to the controller being programmed longer than is necessary by the user, "just to be safe". Users also are susceptible to concerns that insufficient water is being delivered to their plants due to the lack of information feedback; presenting actual, measured, up-to-date irrigation flow information provides the end user with additional insight into the actual system performance, and a degree of assurance that sufficient water is being delivered to the target plants thereby providing an irrigation system that is better understood by the user, thereby allowing the end user to have confidence to reduce irrigation to the minimum needed, thereby saving water.

In accordance with an embodiment described herein, an irrigation-monitoring system includes a flow sensor, an irrigation controller having at least two outputs, and an irrigation monitor coupled to the at least two irrigation controller outputs and the flow sensor. Each of the irrigation outputs is coupled to, and controls, a valve. The irrigation monitor monitors the irrigation controller outputs and flow meter, and performs an action in response to detecting a fault condition. Various flow meter architectures may be used for irrigation monitoring including positive displacement, pressure-based, turbine, or impeller, for example.

In some embodiments the irrigation monitor comprises a processor. Couplings between and/or among the irrigation controller, irrigation monitor, and various sensors and valves may include wired couplings or include a wireless coupling. When implemented on a common processing platform the coupling between the irrigation controller and irrigation monitor can be performed using software-coupling techniques and methods including semaphores, variables, functions, API's, shared memory, etc.

In some embodiments the irrigation monitor includes a level shifter that conditions a signal from the irrigation controller output such that it is compatible with, and may be reliably received by, a processor.

The irrigation-monitoring system can include an impedance sensor coupled to a solenoid for detection of electrical faults, or a pressure sensor for additional state information.

A fault condition can be determined by the irrigation monitor based upon the flow meter output, the irrigation controller output, and a fault criterion, and an electronic communication can be sent in response to a fault condition being determined. The fault criterion can include a nominal or expected transient- or steady-state flow- or pressure-characteristic. Fault detection can also make use of other sensor input such as an impedance sensor or a pressure sensor in conjunction with appropriate fault criterion applicable to the additional sensors.

Various faults can be identified by the irrigation monitor including a stuck-open valve; a stuck-closed valve; a leaky-valve; a leak in an irrigation load; a leak in an irrigation feed; clogged emitters; a broken line; an electrical open; an electrical short; a bad solenoid; excess flow; insufficient flow; a mechanical fault; or an electrical fault.

In response to an identified or suspected fault the irrigation monitor can perform an action including one of the following actions: providing identifying information about an irrigation system component; providing an interface to order an irrigation system component; sending an electronic communication to a user; receiving a communication from a user in response to an electronic communication to a user; performing an action in response to receiving a communication from a user in response to an electronic communication to a user; disabling the irrigation system; extending an irrigation time.

In some embodiments the irrigation monitor can send a periodic report of irrigation system performance including at least one of historical usage; current usage; typical usage for comparable irrigation systems; irrigation performance; or irrigation faults.

In some embodiments a data packet is sent between the irrigation monitor and a service running remotely from the irrigation monitor (e.g. remotely-hosted web server; the "cloud"). The data packet may be sent using sockets; include a UDP packet; include a TCP packet; include a datagram; or include data comprising HTML or XML.

The irrigation monitor can include measuring flow through an irrigation feed; determining an intended state one or more irrigation valves; associating the measured flow with an intended valve state; and detecting a fault condition.

BRIEF DESCRIPTION OF DRAWINGS

The figures listed below provide exemplary embodiments, and are not intended to cover all possible embodiments, including embodiments with additional or fewer components, steps, or connections. The embodiments, techniques, components, connections, and other teachings described in the figures are exemplary and were chosen to provide a clear explanation without unnecessary obfuscation.

DETAILED DESCRIPTION OF THE INVENTION

Figure 1:
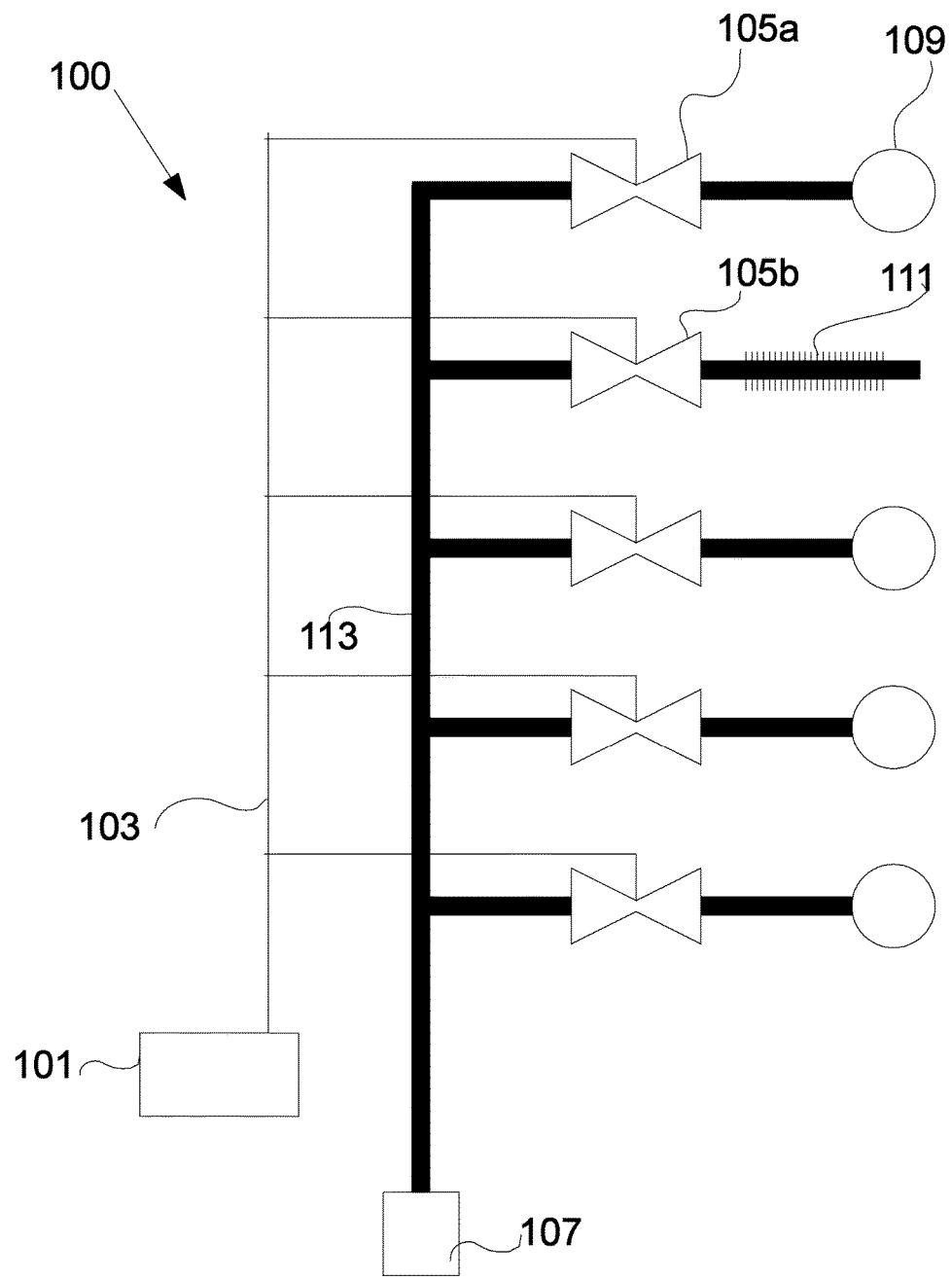
FIG. 1 illustrates a schematic diagram of a multi-zone irrigation system.

Irrigation systems are commonly partitioned into a plurality of zones for various reasons including differences in vegetation, soil, micro-climate, or to provide a lower peak water flow for satisfying restrictions on water delivery (e.g. so as not to exceed a water pumping capacity supplied by a well or a maximum flow-rate of a service line). With reference to FIG. 1, in some embodiments irrigation system 100 has an irrigation controller 101 which connects via wires 103 to remotely located valves 105*a* and 105*b*; in some embodiments the valves are located proximate the irrigation controller and water distribution occurs via piping from the valves. The irrigation valves 105*a,b* are solenoid-actuated and, in some embodiments, control flow using a diaphragm to initiate and terminate watering as determined by the controller. Energy is provided to each valve's solenoid via two conductors: one conductor is commonly shared among multiple valves as a common terminal; the other conductor is connected to an output of the irrigation controller for the zone that the valve controls. Irrigation water flows from a water source 107 (e.g. water main, well, lake, stream, etc.) through distribution pipe (e.g. irrigation feed) 113 which is coupled to the plurality of irrigation valves 105*a,b*. As a common carrier of water the distribution pipe 113 carries water from the water source 107 to the irrigation valves such that were a valve (or valves) to open, water would flow through the open valve(s). Pipe 113 may be made of a plastic such as PVC, PEX, polyethylene distribution tubing, polyethylene drip tubing, or metal such as copper or galvanized pipe. The valves are commonly actuated by applying an electrical signal, often approximately 24 VAC, which energizes a solenoid thereby opening the valve, in this way providing irrigation to one of a plurality of zones. The output side of the irrigation valves 105*a,b* are connected to an irrigation load including a sprinkler 109 and polyethylene drip tubing 111.

Figure 2:
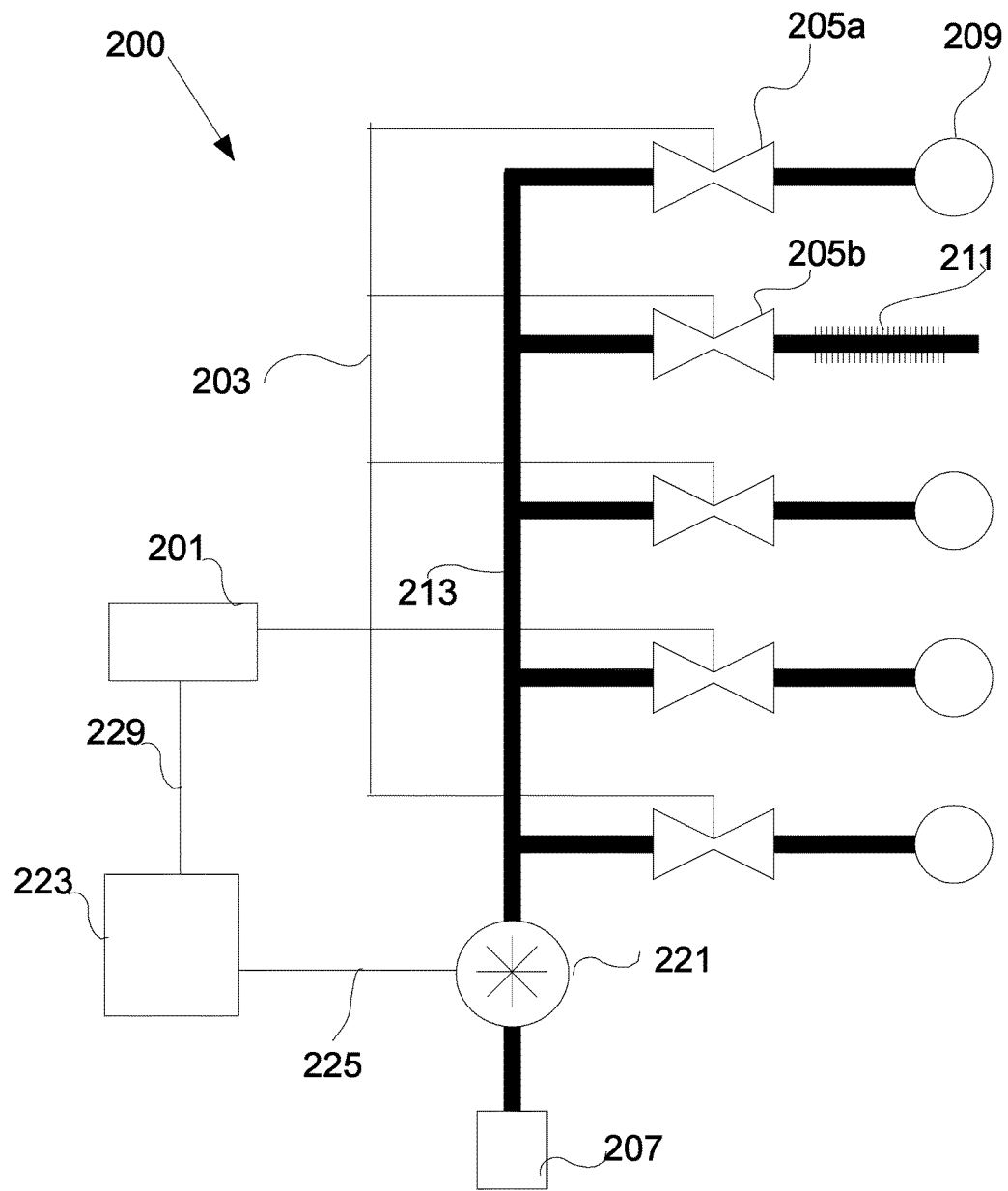
FIG. 2 illustrates a schematic diagram of a multi-zone irrigation system with irrigation monitoring.

With reference to FIG. 2, in some embodiments performance monitoring of irrigation system 200 by irrigation monitor 223 is accomplished using a flow sensor 221 located in series with the water service to the irrigation system 207. Flow sensor 221 is connected to irrigation monitor 223 via wires 225; in some embodiments the connection is made wirelessly. Irrigation wires 203 are connected to the irrigation valves 205a,b and the irrigation controller 201 and further connected to the irrigation monitor 223 via wires 229 which are coupled to a terminal block in irrigation controller 201. Detection of irrigation valve state by the irrigation monitor allows the monitor to determine which zone or zones are presently desired, by the controller, to be watering and associate the actual measured flow with that particular zone or combination of zones. In some embodiments power for the irrigation monitor is provided from the same power source (e.g. a stepped-down voltage from the wall voltage; the output from a wall transformer) as is used to power the irrigation solenoids and/or irrigation controller. In some embodiments flow sensor 221 comprises a positive-displacement flow meter such as a nutating-disk flow meter, a meter using a gear or a piston to effect a positive-displacement mechanism, or any other appropriate positive-displacement meter. In some embodiments when low-flow accuracy is less important and cost is more important a lower-cost flow meter may be used, such as a turbine-, or an impeller-based flow meter, or a meter that uses pressure to detect flow. In some embodiments the nutating-flow meter is a Badger Meter Brand RCDL nutating disk flow meter with pulsed output having a part number M25-750LNPB-TD-XXXX.

Figure 3:
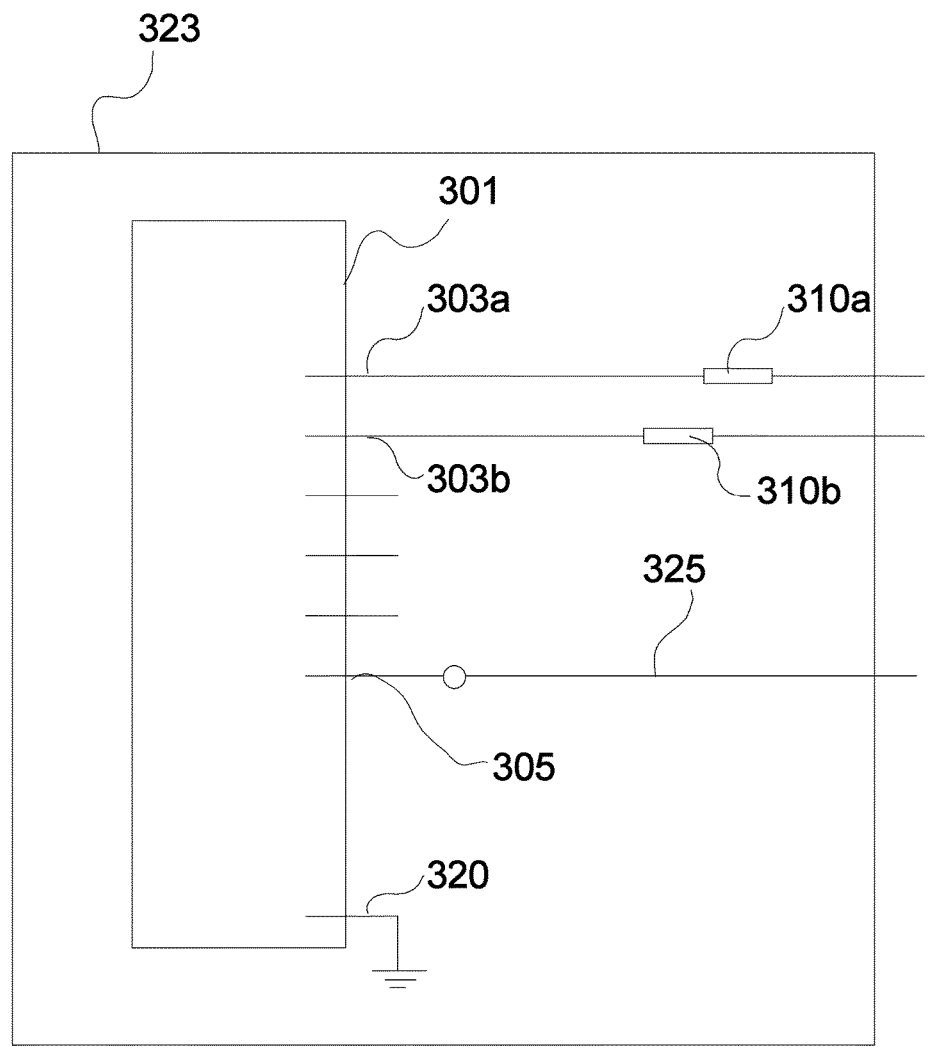
FIG. 3 illustrates an exemplary irrigation monitor comprising a processor.
Figure 4:
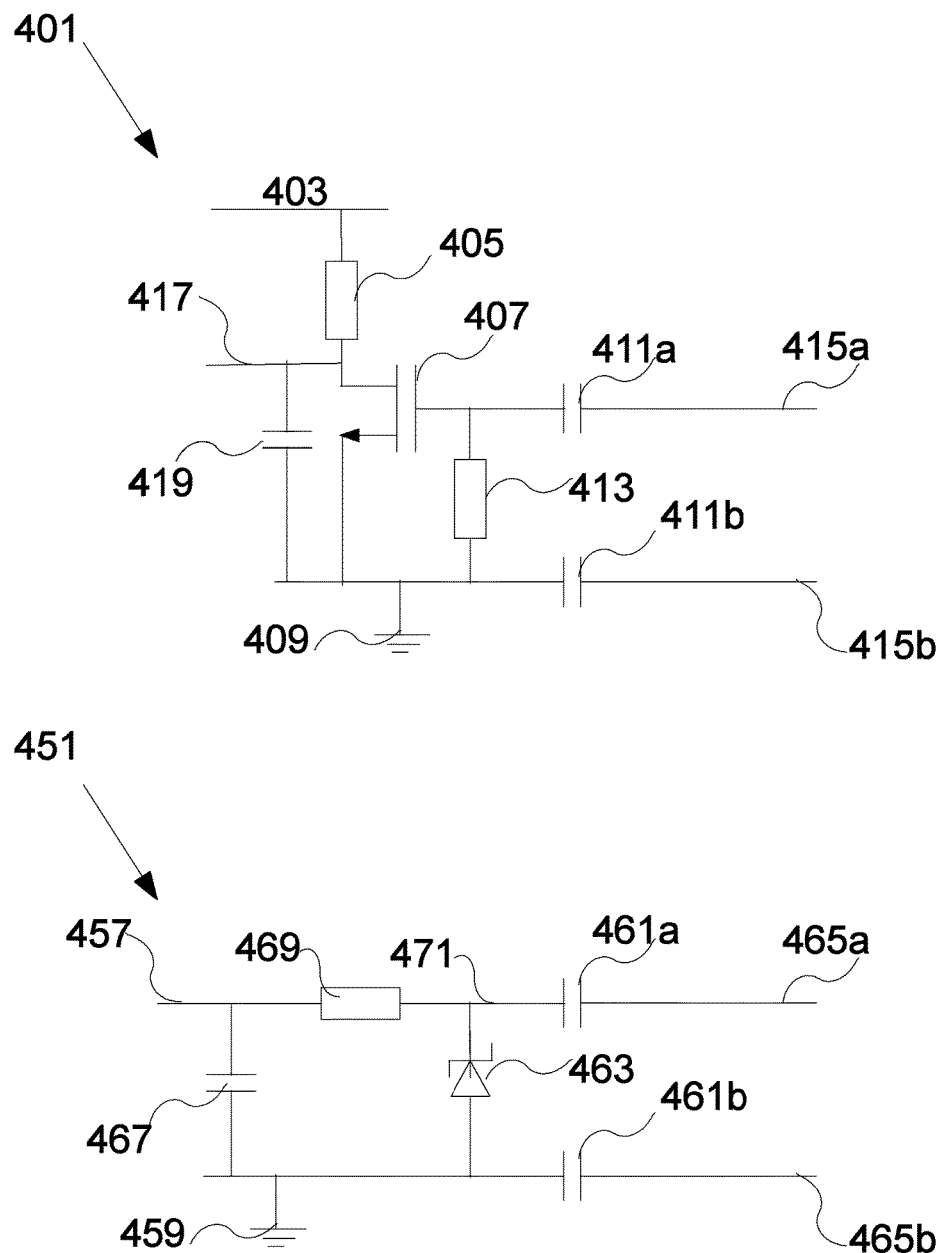
FIG. 4 illustrates schematic diagrams of two exemplary level-shifting circuits.

Referring to FIG. 3, in some embodiments irrigation monitor 323 comprises a microprocessor 301 with a plurality of digital inputs 303a, 303b, etc. Processor 301 comprises a platform integrated circuit having processing (e.g. calculating) capabilities, storage capability, and digital-input and digital-output capabilities (e.g. Atheros AR9331, Texas Instruments AM3358, Intel Quark X1000, or Broadcom BCM2837). The digital inputs, and a ground terminal 320 (which may coupled to one of two outputs of an isolated power transformer arbitrarily defined as ground or taken from a bridge circuit), are coupled to the irrigation controller via wires (e.g. 229) and level-shifting circuitry 310a,b; each digital input 303a, 303b of the microprocessor is coupled to a different wire for the solenoid valves so that there is a one-to-one mapping of each digital input to the corresponding valve's energy state. Level-shifting circuitry 310a, 310b is used to condition the 24 VAC typically used for controlling irrigation valves to a voltage level with respect to ground 320 that is compatible with digital inputs 303a, 303b of the microprocessor. Detailed examples of two embodiments of appropriate level shifting circuitry are shown in FIG. 4. In some embodiments opto-isolators, relays, or any other appropriate circuit is used for level shifting. Acceptable voltage input levels to commercially available microprocessors are generally less than 5V and commonly 1.2 to 3.6V. In one embodiment, digital input 305 having a pull-up resistor is connected to the flow meter by wire 325; the flow meter periodically closes a magnetically-actuated switch coupled between the digital input and ground, indicating a volume has passed, causing the digital input to drop low and be sensed by software running on the microprocessor. In various embodiments, in lieu of digital input 305 an analog signal such as a voltage proportional to flow is provided to an analog input of microprocessor 301; wire 325 is not present and the state of the flow meter is provided wirelessly.

In some embodiments processor 301 executes software that processes signals presented to digital inputs (e.g. 303a, 303b, 305) such that the state of the irrigation system may be compared to one or more failure criterion. The software may include totalizing a number of pulses from a pulsed-output flow meter; comparing one or more of a steady-state or transient pressure- or flow-profiles with a corresponding failure criterion; evaluating an impedance sensor output; keeping track of time; preparing, sending or receiving an electronic communication; or any other appropriate processing operation.

FIG. 4 shows two embodiments of level shifting circuitry appropriate for conditioning a 24 VAC solenoid-actuation signal to a microprocessor. Level-shifter 401 couples 24 VAC signal applied to nodes 415a and 415b to capacitors 411a and 411b. Capacitor 411b is coupled to ground 409 while capacitor 411a is coupled to the gate of NMOS transistor 407 and resistor 413. The drain of NMOS 407 is coupled to resistor 405, which is in turn coupled to a processor-compatible supply voltage 403. As AC signal is applied the gate of NMOS 407 will be driven above and below the DC gate level, which is set to ground by resistor 413. When the positive voltage excursions across the gate-source terminals of 407 rise above the threshold voltage of NMOS 407 the NMOS turns on causing output node 417 to drop, thereby indicating the irrigation zone is energized. Capacitors 411a and 411b should be sized such that the gate drive at 407 is large enough to reliably turn on 407 while driving the gate capacitance of 407. To prevent damage to NMOS 407, capacitors 411a,b may be sized considering an additional criterion of ensuring the voltage excursions at the gate of 407 are attenuated through capacitive division with the gate capacitance or another capacitor added in parallel with 413 to avoid exceeding an operating condition of NMOS 407 (e.g. maximum gate-source voltage). In some embodiments a Zener diode or other protection device is coupled to the gate of the NMOS to prevent an operating condition from being exceeded. The level shifted output at 417 is coupled to the processor. Optional capacitor 419 causes the output of 417 to remain low when NMOS 407 is off during the times of negative voltage excursions at the gate according to the RC filter time constant formed by capacitor 419 and resistor 405. Choosing this time constant to be substantially longer (e.g. 10×) than the frequency of the AC input to nodes 415a,b causes node 417 to remain logic-level low at the input to the processor for all portions of the AC cycle. In the event that capacitor 419 is not used, detection of irrigation state is determined by looking for toggling edges at 417, indicating irrigation is energized, as opposed to a static logic level.

Level-shifter 451 couples 24 VAC signal applied to nodes 465a and 465b to capacitors 461a and 461b. Capacitor 461b is coupled to ground 459 while capacitor 461a is coupled to Zener diode 463 and resistor 469. When an AC signal is applied such that node 471 is at a lower potential than node 459 the Zener diode conducts in the forward direction, clamping the output node 471 at a negative diode drop with respect to ground, which is typically on the order of 0.7V. When node 471 is higher then 459 node 471 rises until the voltage applied across the Zener reaches the Zener voltage Vz, at which point the voltage at node 471 is clamped to Vz. Resistor 469 in combination with capacitor 467 forms a low-pass filter, presenting at the output 457 the average voltage over a full AC cycle which is approximately Vz-0.7V. Vz is chosen such that the voltage at 457 is compatible with a digital input of the processor. In some embodiments an additional resistor is placed in parallel with capacitor 467 forming a voltage divider with resistor 469, to attenuate the voltage further. The circuits of FIG. 4 also have the advantage of being galvanically-isolated as well as low-cost to implement.

Using the solenoid energizing signal, as conditioned by level shifting circuitry, to provide information as to the intended (e.g. by the irrigation controller) state of the irrigation system is beneficial since such a method allows monitoring of many irrigation systems already deployed in the field having multiple zones using a single flow meter, as solenoid control by 24 VAC is a common actuation scheme for irrigation valves. In various embodiments the energizing signal is AC, DC, current-mode, voltage-mode, or a potential difference different than 24 VAC. Thus, detection of desired irrigation valve states by the irrigation monitor allows functional multiplexing of a single flow meter between multiple irrigation zones (e.g. the present flow corresponds to the zone that is presently actuated) thereby reducing cost of an irrigation monitoring system substantially.

In some embodiments the irrigation monitor comprises software executed on the same integrated circuit, module, processor, or processor-core as an irrigation control algorithm or irrigation controller, and the intended state of irrigation valves are communicated to an irrigation monitor via one or more variables, registers, semaphores, APIs, memory locations or any other appropriate way of communicating valve state to the irrigation-monitor software. In some embodiments including the irrigation monitoring software with the irrigation algorithm on the same microcontroller or microprocessor reduces costs and improves reliability as fewer physical connections (e.g. wires, level translators, integrated circuits) are required to effect the combined functionality of an irrigation controller and an irrigation monitor. In some embodiments the irrigation monitor and the irrigation controller are implemented as two functions within a single program. In some embodiments the irrigation monitor and the irrigation controller are implemented as a single function within a program.

In some embodiments a processor executes an irrigation monitoring algorithm and an irrigation control algorithm on the same integrated circuit. The irrigation control algorithm controls the intended state of the irrigation valves according to the zone, a schedule entered by a user, and a clock. The irrigation control algorithm actuates a valve by asserting a digital output from the processor, the digital output being coupled to the coil of a relay. The relay is activated in response to the digital output being asserted, which causes the relay to close; the switching terminals of the relay are located in series with the valve and a power source such that closing the relay causes the valve to be energized. In some embodiments instead of a relay a transistor, a triac, a thyristor or any other appropriate circuit element able to provide sufficient drive to energize the solenoid with input voltage and current levels compatible with the processor is used. In some embodiments the nominal schedule is adjusted according to information received about local precipitation, temperature, light level, relative humidity, or any other appropriate condition that affects the amount of water needed by plants within a zone. For example if a precipitation gauge indicates 1 inch of water fell within the past 24 hours the irrigation is disabled; if the temperature is 20 degrees higher than nominal for the date and location then watering schedules are lengthened to provide additional water. The received information may be received from a weather station on premises or from a local weather station. The irrigation monitor receives information (e.g. via a variable, memory location, register, API, callback, or function) from the flow meter and the irrigation controller, running on the same platform, and determines the presence of absence of a fault, and performs an action in response to determining the presence of a fault.

In some embodiments an irrigation algorithm keeps track of the day and time, and opens and closes valves according to a schedule entered by the user. When the irrigation controller is combined with the irrigation monitor on a processor or processors one or more of the irrigation monitor and irrigation controller may reside as a software function, process, subroutine, callback function, object, method or any other appropriate software abstraction technique. In some embodiments an irrigation controller algorithm considers environmental inputs such as weather, precipitation, or an estimate of plant transpiration to adjust the irrigation valves from the nominal schedule. In some embodiments the irrigation controller schedules a watering event for a zone based on units of time; in some embodiments the watering event is specified by units of flow.

In some embodiments the processor that performs the irrigation monitoring and/or irrigation control algorithm is a platform integrated circuit (e.g. Atheros AR9331, Texas Instruments AM3358, Intel Quark X1000, or Broadcom BCM2837) running an operating system that includes support for WiFi, ethernet, bluetooth, or any other protocol that provides for connection to the internet. In some embodiments the platform includes a system clock, a plurality of digital inputs, an analog-to-digital converter, or a digital-to-analog converter. In some embodiments the processor is part of a raspberry-pi brand embedded platform. The low cost and high degree of functionality of such platform integrated circuits, due to their mass manufacture for cell phones, provides a computational platform having the required processing power and characteristics for extremely low cost, enabling a larger market for cost-sensitive irrigation monitoring applications.

In some embodiments an action is automatically taken in response to a signal from the irrigation monitor. In some embodiments the action is to disable the valve in response to a leak being detected; to water for an extended period of time in response to less water being measured as delivered than expected; to send an email, text, or other electronic communication in response to a fault being detected and query a desired action from the user; or any other appropriate action. In some embodiments an additional valve is located in series with the flow meter (e.g. in series with the irrigation feed) to allow the water to the irrigation system to be turned off when a fault occurs (for example, a broken pipe is detected, an irrigation valve in the stuck-on position is detected.

In some embodiments an alert, a text, a phone call, or other appropriate communication is provided when water consumption is above a threshold; the threshold may be in units of volume or cost with the estimated water cost being calculated based upon the water used and a local water rate. The threshold may be controlled or set by the user.

In some embodiments a data packet is sent between the irrigation monitor and a service running remotely from the irrigation monitor (e.g. remotely-hosted web server; the "cloud"). The data packet may be sent using sockets; include a UDP packet; include a TCP packet; include a datagram; or include data comprising HTML or XML. In various embodiments data is sent over the internet; a wired communication line; a fiber communication line; wirelessly using WiFi; a cellular network; a satellite link; or any other appropriate communication technique.

In some embodiments the data packet is received by the remote service and processed by the remote service, the processed data being made available to a user. In one embodiment an irrigation monitor sends a data packet to the remote service every time a volume of water (e.g. one gallon) has been indicated as consumed by the flow meter, along with information indicating the state of the irrigation zone valves. The remote service compiles these data and provides a graphical representation of flow for at least two zones in response to a user request through a web browser. In various embodiments the flow is presented over a selectable time period, for example each point on a line graph represents the amount of water consumed over an integration period, and sequential points on the line graph are separated by an integration period where an integration period is selectable by a user (e.g. minute, hour, day, month, year, lifetime). In some embodiments flow is presented by zone, meaning that water consumption in each zone is indicated distinctly in the graph. In some embodiments the flow is presented as a total flow per irrigation event, for example each bar in a bar-graph representing the amount of water consumed over an integration session, each integration session being represented by a different bar.

In some embodiments information regarding fault conditions is sent in a datagram by the irrigation monitor, received by the remote service, and processed by the remote service with the processed data being made available to a user. In some embodiments a packet is received by a remote service indicating a fault condition; the remote service processes the packet and responds by indicating a fault condition on a web page or by sending an electronic communication to a user who has registered their contact information with the service.

In some embodiments a summary of irrigation status including information of water delivered by zone is sent to a user via email, text or other electronic communication on a periodic basis, such as daily, weekly, or monthly.

In some embodiments a message is sent to a user in the event that no irrigation valves have been detected as enabled for a period of time (e.g. a week) to alert the user in the event that the irrigation controller itself has experienced a fault (e.g. lack of power to the irrigation controller, broken irrigation controller).

Detection of flow and the irrigation system intended state, along with other sensing parameters such as pressure in some embodiments, allows many different fault conditions to be detected and identified. For example, a stuck-on valve, in some embodiments, is identified when all irrigation valves are detected as de-energized and flow continues at a rate $Q_{Leak}$. The stuck-on valve may be identified by turning on each of the controlled valves, one at a time, measuring the flow, then disabling the valve in sequence. If the stuck valve is stuck full-on then the flow will increase with each additional valve N that is energized to a total flow of $Q_{Leak}+Q_N$, where $Q_N$ is the flow rate of valve N, and then decrease back to $Q_{Leak}$ when valve N is disabled, with the exception of the stuck valve N=S; when the stuck valve N=S is energized the flow will not change because the valve is already fully open. In this manner the stuck valve is readily identified and may be serviced. In the event that $Q_{Leak}$ is less than the full-on flow rate of stuck valve S the stuck valve is identified as the valve having a smaller change in flow rate from off- to on—than expected.

In some embodiments detection of a reduced flow rate identifies faults such as clogs, pinched or kinked lines, clogged emitters, defective valves, defective solenoids, wiring faults, or any other faults that may lead to an irrigation failure where water doesn't flow when the irrigation controller attempts to actuate the valve. The fault may be a mechanical fault, such as a clogged or a pinched line, or an electrical fault such as a defective solenoid, or defective wiring connection between the irrigation controller and the solenoid. Mechanical faults where the valve is actuated successfully may be identified using measured flow or pressure changes in conjunction with the information about zone from the irrigation controller. Flow rates that are lower then the expected value indicate a clog or pinched line. By detecting the pressure as the line fills with water one can also infer where the clog is by considering the evolution of pressure and flow versus time in the irrigation line as the line is opened and the air is squeezed out of the emitters or sprinkler heads: clogs close to the valve will cause less volume of water to flow before the pressure rises indicating the tube is filled with water since air must be pushed out of the line as it is filled with water; air flows through endpoints and leaks at a rate much faster than water. This information is processed to determine an approximate location of the fault.

Figure 5:
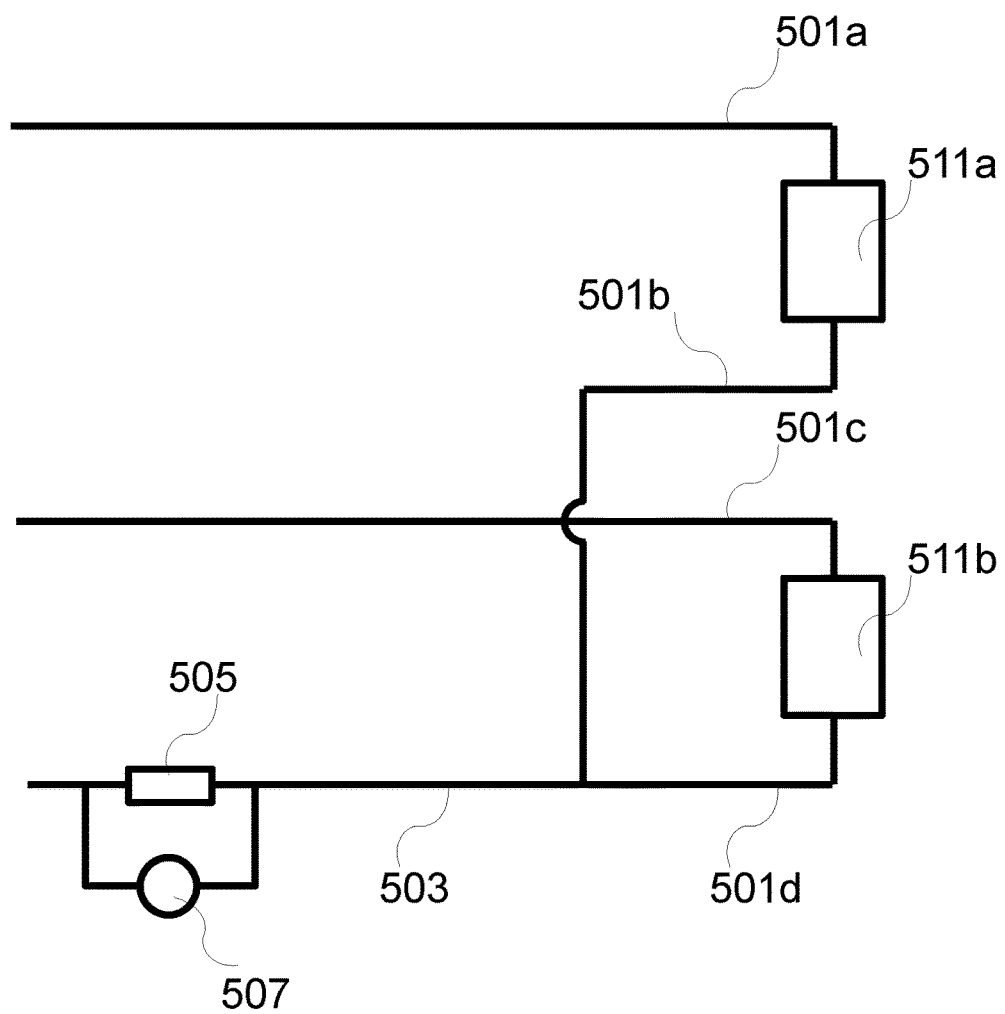
FIG. 5 illustrates a schematic diagram of an exemplary impedance tester.

In some embodiments detection of electrical faults (e.g. opens and/or shorts) in the line between the irrigation controller and the solenoid is included in an irrigation monitor to aid the user in irrigation fault detection and maintenance. In some embodiments an impedance tester is included as part of the irrigation monitor to further aid monitoring in the case of a stuck-off valve; is included as part of the irrigation controller. In addition to being subject to breakage and short circuiting caused by similar conditions that cause failures in the irrigation pipes, the circuit from the irrigation controller requires an electrical connection to be made at the solenoid, which is typically made with screw-on caps, often outside of a weatherproof electrical box, and are therefore subject to corrosion, breakage or shorting due to water, weather, and mechanical stressors. Line-impedance as determined by the impedance tester can provide information as to whether there is an open, a short, or the solenoid impedance is out of range indicating a defective solenoid. In some embodiments the nominal solenoid impedance is 40 Ohms at DC, a bad solenoid is indicated when the impedance is over 100 Ohms but less than 1000 Ohms, an open is inferred for an impedance greater than 1000 Ohms, and a short is indicated for an impedance less than 10 Ohms. With reference to FIG. 5, irrigation solenoid valves, in some embodiments, are remotely actuated from the irrigation controller using wires 501a, 501b, 501c, and 501d to carry the solenoid current from the controller to the solenoid; a common wire 503 is shared amongst multiple solenoids for a portion of the distance from the solenoid to the controller. When a solenoid valve is actuated the current flows through the wire 501a or 501c coupled to the particular solenoid, but also flows through common wire 503. Common wire 503 has a series resistance 505, which may be located in the irrigation controller or irrigation monitor, sized sufficiently large enough to provide a signal detectable by voltage detector 507 (e.g. voltage-mode analog-to-digital converter, voltage meter) in response to a nominal actuation current while not being so large as to adversely affect the actuation of the solenoid valve. For example, a nominal DC coil resistance of 40 Ohms would provide a signal across resistor 503 of approximately 0.6 VAC for a resistance of 1 Ohms. The impedance measured in the common-line 503 is associated with the corresponding zone using the state of the irrigation controller output to identify the actuated zone. In this fashion the indicated electrical fault may be presented to the user with the additional information as to which zone the fault lies in. If the impedance fault is common and similar in all zones a fault in common conductor 503 is indicated as a probable source of the fault. In various embodiments line impedance is measured at a frequency other than DC; the line impedance is determined when the irrigation controller is not activating a zone for irrigation by forcing a voltage on the line and measuring the current required to force the voltage; a current is forced and a voltage is measured, or any other appropriate method of detecting impedance. In some embodiments the impedance of a solenoid circuit associated with a particular zone is compared with historical or expected values of impedance and a fault indicated if a change greater than a threshold (e.g. 50%) is detected in the impedance.

Figure 6:
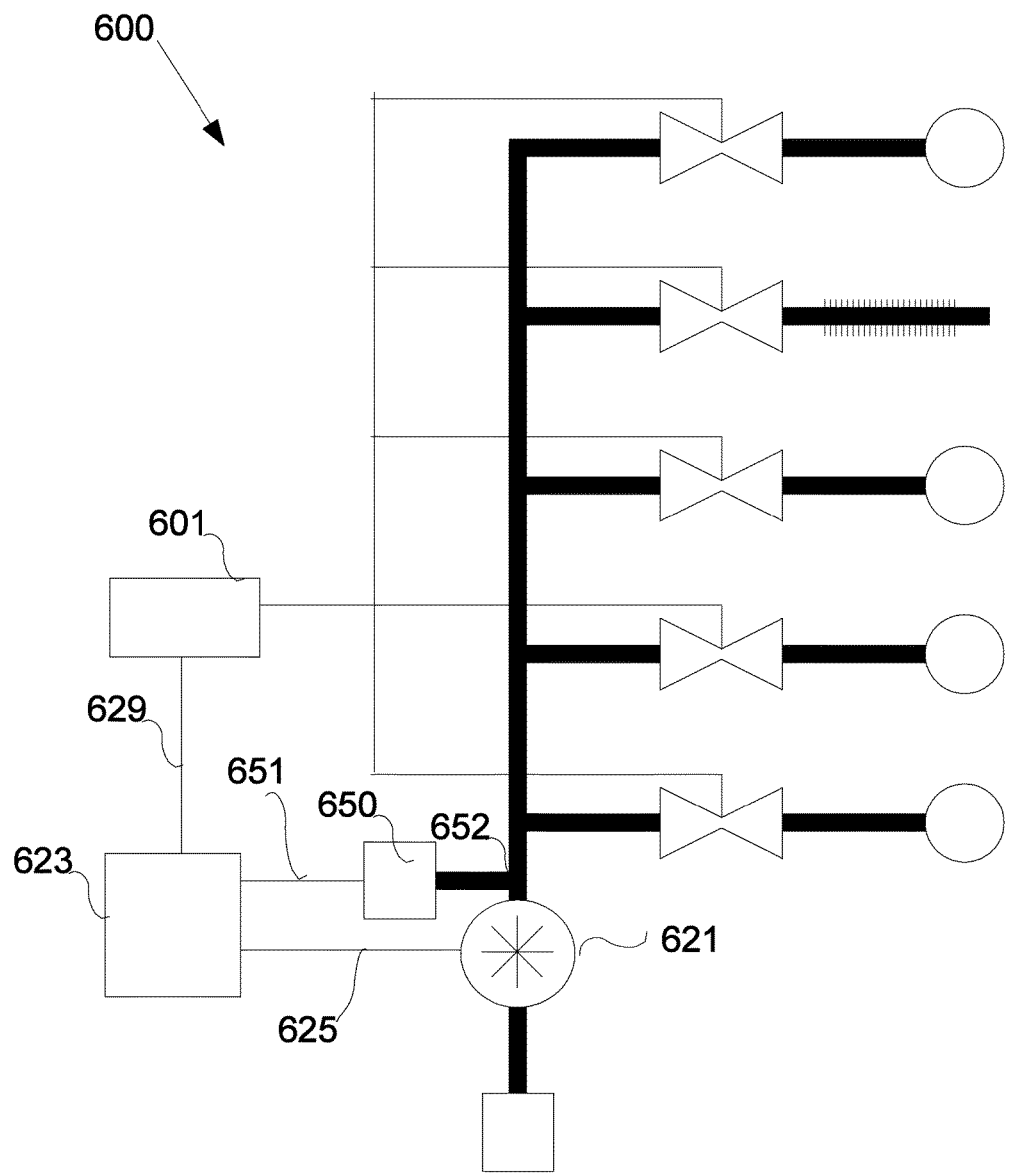
FIG. 6 illustrates a schematic diagram of an exemplary irrigation system comprising a pressure sensor.

With reference to FIG. 6, in some embodiments the irrigation monitor comprises processor 623, pressure sensor 650, coupling 651 between pressure sensor 650 and processor 623, flow sensor 621, and coupling 625 between flow sensor 621 and processor 623. Irrigation controller 601 is coupled to processor 623 by coupling 629. In some embodiments one or more of couplings 651 and 625 include wires; in some embodiments the coupling uses wireless communication (e.g. bluetooth, 802.15.4, WiFi, or any other appropriate wireless communication technique). Pressure sensor 650 provides information about water pressure at point 652, which is located before any of the the irrigation zone valves in the irrigation system. In some embodiments the pressure sensor is used in conjunction with the flow meter to perform an irrigation monitoring function. While some drip irrigation emitters include pressure-compensating emitters many other types of irrigation endpoints have a flow dependence on pressure, for example lawn sprinklers or non-pressure-compensated drip emitters. Using a pressure sensor at the input to the irrigation system as an additional data point allows the irrigation monitor to correlate the input water pressure at 652 with the flow rate: higher pressures generally correspond with higher flow rates and lower pressures correspond with lower flow rates. This information is used to differentiate nominal variations in flow due to variations in provided pressure from actual irrigation system faults. In some embodiments historical measurements of flow and pressure are used to determine a functional relationship between the input pressure and flow rate on a per zone basis using, for example, regression analysis or least squares fitting to an appropriate basis function. For example flow and pressure data is collected from a first zone at a first and a second time wherein the pressure measured at the first time differs from the pressure measured during the second time; these data are used to fit the following equation $Q(P)=Q_0+P*Q_1$ where $Q(P)$ is the flow as a function of pressure and $Q_0$, $Q_1$ are parameters from a least-squares fit. Once this historical relationship has been established it may be used to adjust the expected flow rate due to ambient pressure conditions detected at 652. In some embodiments the system is put in a calibration mode during installation which intentionally reduces the pressure at the water main inlet, before the pressure sensor, to allow a functional relationship between pressure and flow to be established without historical data gathered in-situ.

In some embodiments irrigation is controlled using a volume (as opposed to time) set-point to compensate for the variable flow versus pressure by actuating an irrigation zone with an irrigation controller, measuring the flow into the actuated irrigation zone, and sending a message to the irrigation controller via a wire, a variable, a memory location, an interrupt or any other appropriate messaging technique to turn off the actuated valve after a pre-determined volume of water is attained.

Figure 7:
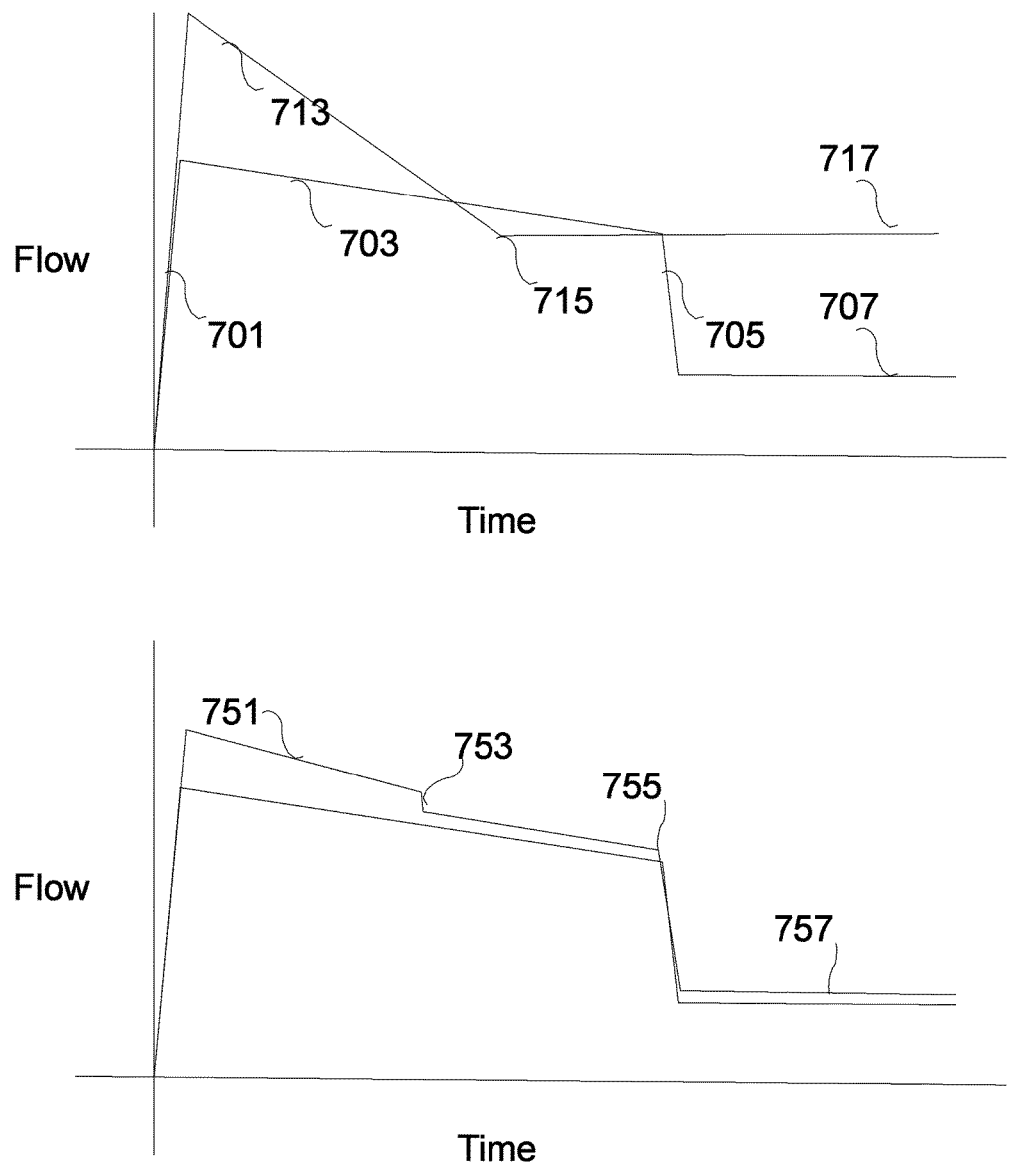
FIG. 7 illustrates flow profiles for various irrigation conditions.

In some embodiments leaks in an irrigation zone are monitored and detected by comparing the actual flow profile of a particular zone to the expected flow profile of the zone, or with a threshold. The threshold may be entered by a user manually, or may be derived using measurements of the irrigation system at installation, a long term average updated when irrigation events occur with a potential forgetting factor to de-weight older measurements of flow (e.g. a high-pass filter), or at any other measurement time that the user specifies. The flow profile may include one or more metrics of the irrigation flow or pressure and how these quantities vary over time. In some embodiments the flow profile may include one or more metrics of the steady-state irrigation flow or pressure. In some embodiments the pressure or flow vs. time when starting irrigation will vary with leaks and/or clogs since i) water and air have different flow rates through the endpoints of most irrigation systems; and, ii) air must be pushed out the irrigation holes, and leaks and or clogs change this rate of evacuation. In some embodiments the pressure, flow, or a combination thereof is measured versus time as the irrigation controller is enabled or disabled and this characteristic compared with a characteristic taken at an earlier time when the irrigation system was deemed to operating normally. For example, when irrigation is initiated on an empty irrigation pipe the water flows very rapidly at low pressure, pushing the air out of the tube as the water replaces the air in the pipe until the pipe is filled, at which point the flow slows and the pressure rises. Because these parameters are functions of the irrigation pipe length, diameter, and irrigation load (e.g. emitters and/or sprinklers) variations in these parameters and how they evolve over time provide valuable insight into the health of the irrigation system. With reference to FIG. 7, when an irrigation valve is opened water starts to flow rapidly as the pressure accelerates the water from no flow, indicated by 701. After the water starts to flow at the flow meter it flows at a rate of 703 which decreases over time as the water displaces the air in the tube, reducing the number of endpoints air is evacuating from, and pressure drop from the water flowing in the tube increases due to e.g. viscous forces. At 705 the last of the air is evacuated from the tube and the flow drops to the nominal steady state flow 707. If the measured steady-state flow 717 is high compared to nominal steady state flow 707, then this indicates a line break. The presence of a major line break is also evidenced in the filling portion of the curve 713 because there is less back pressure from the air being forced from the tube and the tube fills earlier at 715 than in the normal case at 705. As another example, if an emitter comes out of the distribution tubing, leaving an unplugged hole, the flow profile 751 will be substantially higher until water traverses the hole, since the air will be forced out this hole increasing the flow rate. After water has filled the pipe to the unplugged hole, at 753, the flow will continue at a reduced rate, but faster than nominal, because water instead of air is leaving the hole, while the remaining air in the tube is forced out the emitters; the location of the hole may be identified by the time or the volume of water corresponding to the change in flow at 753. The steady-state flow rate is faster than nominal shown by 757; this excess flow of water occurs starting after point 753, indicated by 755. In some embodiments pressure, or pressure and flow are used to identify changes in a transient flow profile. Note that a leak within in a zone is distinguishable from a stuck-on valve because the leak rate will go to zero when the zone is disabled. In some embodiments the irrigation monitoring system can be configured to be tolerant of small changes in flow profile to avoid nuisance irrigation-fault events.

In some embodiments when an emitter has been removed from an irrigation line, the undesired flow due to this fault is approximately 60 gallons per hour (GPH) which is 120 times more water flow than with a common 0.5 GPH emitter. In some embodiments, according to the United States Environmental Protection Agency, an irrigation system should be checked each spring before use to make sure it was not damaged by frost or freezing and an irrigation system that has a leak 1/32nd of an inch in diameter (about the thickness of a dime) can waste about 6,300 gallons of water per month. In some embodiments an irrigation integrity test is performed in response to a seasonal change, or in a change in a temperature from below the freezing point of water to above the freezing point of water.

In some embodiments time-domain reflectometry (TDR) is used to identify breaks, leaks, or clogs in an irrigation line by measuring the pressure over time at a location in the line and processing this information to determine the location of the fault. In one embodiment a pressure sensor or acoustic transducer with a measurement bandwidth greater than 100 Hz is connected to the line at the irrigation system's connection to the water main and an actuator is provided to inject a pressure signal into the line. In various embodiments the actuator 703 may be a valve, a solenoid, a hydrophone, an acoustic transducer, the acoustic transducer used for measurement operating in a electrical-to-acoustic transducing mode, or any other appropriate transducer. The irrigation line to be measured is filled with water and a pressure (e.g. acoustic) pulse is applied to the line, and the pressure or acoustic energy monitored after application by the transducer. The pressure pulse will travel down the irrigation hose from the point of application at the speed of sound in water and reflect when passing by regions of the hose with a different acoustic impedance, for example a discontinuity due to a break or a T where a line is split. The magnitude, phase, and time of these reflected pulses, as sensed by the pressure sensor or acoustic transducer, may be used to determine the existence and location of potential leaks. In some embodiments the pressure pulse has orthogonal autocorrelation properties (e.g. a Gold code) to allow high-resolution detection of pressure signals at levels below the measurement noise floor. In some embodiments the pressure pulse and measurements are repeated numerous times to provide for improved signal-to-noise ratio.

In some embodiments the steady-state flow of a zone (e.g. after the initial turn-on transient when the irrigation system is filling with water and the pressure is stabilizing) is compared with an expected steady-state flow for the zone thereby performing irrigation monitoring. Flow rates greater than the expected steady-state flow are suggestive of leaks in the line, with larger discrepancies corresponding to larger leaks. In some embodiments historical data is used to determine a statistical variation in flow over time; an error condition is deemed to be present when the flow varies from the nominal value by more than a certain number of standard deviations. The expected flow rate is a function of the zone being actuated since different irrigation zones may have different irrigation loads due to the number of emitters or endpoints as well as the types of endpoints. In one embodiment the expected flow rate for a particular zone is set to a trailing average of the measured flow rate during the past 10 times the zone being monitored was actuated; a standard deviation of the flow rate is constructed using the past 50 times the zone has been actuated; if the change in flow from the trailing average is greater than three standard deviations in the flow rate an alert is sent to the user. Flow rates lower than the expected value are indicative of clogged emitters or pinched or otherwise obstructed irrigation tubing. In some embodiments user intervention is required before performing an action in response to a fault detected by the irrigation monitor because the detected fault condition may be a desired change in irrigation system configuration. In a condition where the flow is greater than expected the user receives a query via the Internet (email, text, phone call, VOIP communication, or any other appropriate communication) if emitters were added and/or the irrigation system changed. If the answer is yes this new expected flow rate is set to measured flow rate. If the answer is no then the amount of the leak and the zone are indicated to the user. In a condition where the flow is less than expected the user receives a message asking if emitters were subtracted and/or the irrigation system changed. If the answer is yes this new expected flow rate is set to measured flow rate. If the answer is no then the amount of reduced flow and the zone are indicated to the user for service.

Figure 8:
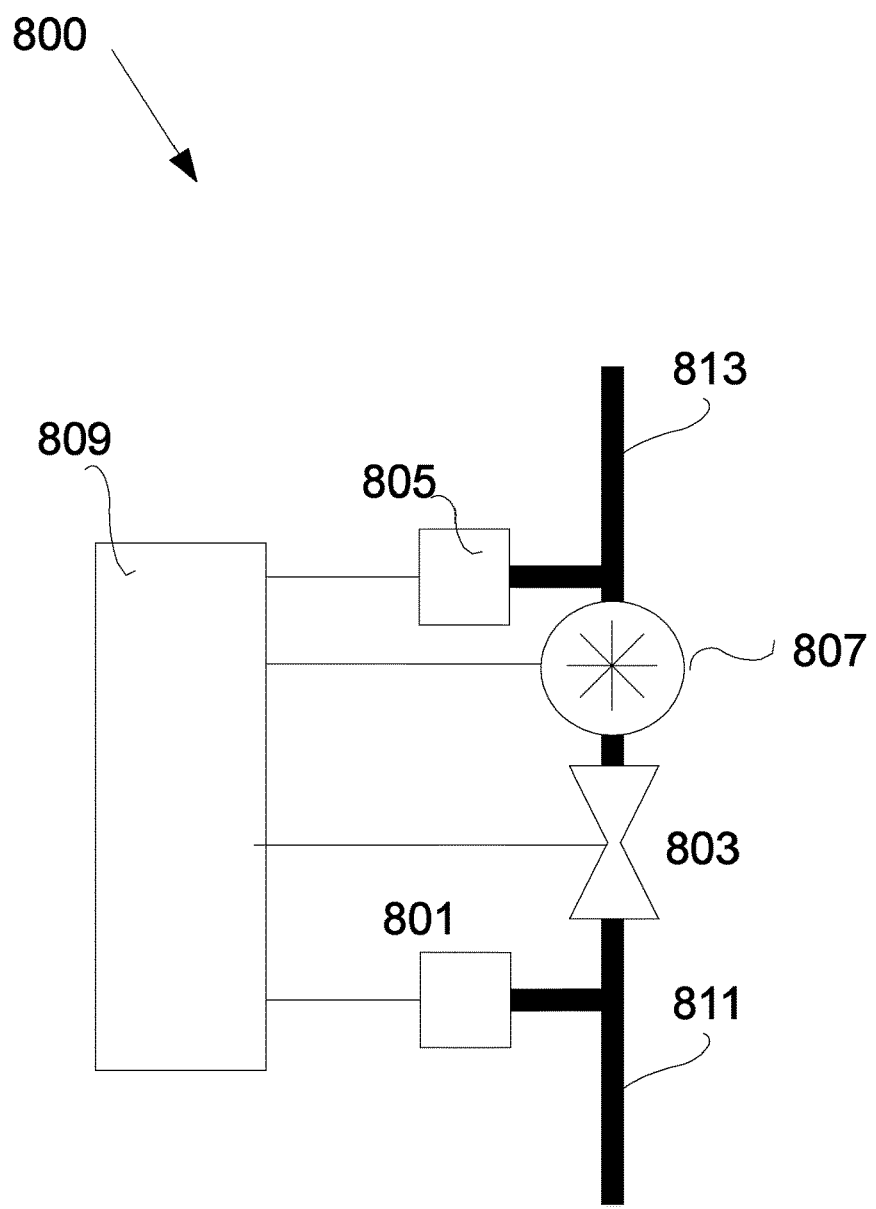
FIG. 8 illustrates a schematic diagram of an exemplary backflow preventer comprising a flow meter and pressure sensor.
Figure 9:
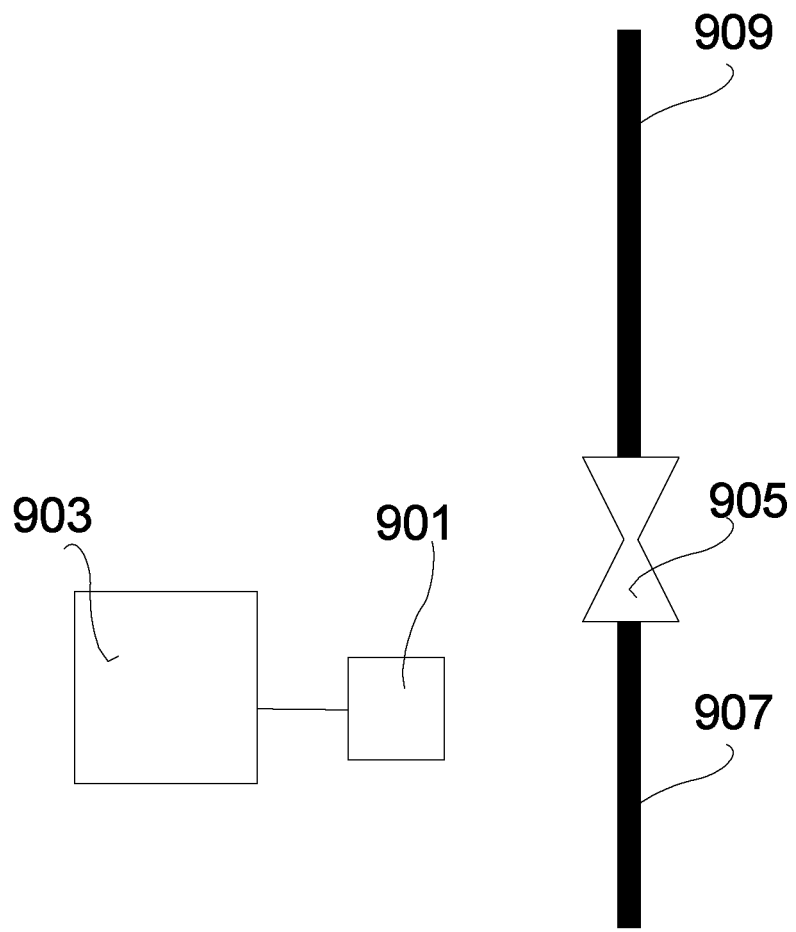
FIG. 9 illustrates a schematic diagram of an exemplary embodiment of a wirelessly-actuated irrigation valve.

In some embodiments backflow prevention is required by building-code when connecting an irrigation system to a potable water supply to prevent the potable water supply from being contaminated if the water-service pressure drops. In some embodiments installation of a backflow preventer requires ongoing, periodic inspection and service of the backflow preventer to ensure proper operation. An active backflow-preventer is effected using a flow meter, at least one pressure sensor, a processor, and an electrically-actuated valve coupled in series with the flow meter. With reference to FIG. 8, backflow preventer 800 comprises input pressure sensor 801 on the water-service side of the flow meter, normally closed valve 803 (e.g. power must be actively applied for the valve to open), a second pressure sensor 805, flow meter 807, backflow preventer input pipe 811, and processor 809. Processor 809 receives measurements from pressure sensors 801 and 805, and flow meter 807 and calculates based on the received measurements the presence of a backflow event. Backflow is detected and may be prevented when a pressure condition is measured according to the output of one or more pressure sensors, or a flow sensor condition indicating reverse flow is detected. In various embodiments a backflow prevention event (BPE) is triggered when the input pressure sensor drops below an absolute threshold indicating loss of water main pressure; when the output pressure sensor rises to a level above the input pressure sensor, indicating back pressure; when the output pressure sensor detects a pressure drop across the valve lower than a threshold; or when the output pressure sensor detects a pressure less than a threshold. In some embodiments when the irrigation system is not intentionally actively flowing water valve 803 remains closed to prevent a backflow condition. When irrigation is desired valve 803, and the valve local to the desired zone, are both opened allowing water to flow to the irrigation target. In some embodiments a measurement of direction of flow by the flow meter is used to make a decision about a BPE, causing valve 803 to close in response to reverse flow being detected. In some embodiments a water meter uses motion of a magnet past a switch or other detector to count rotations of a nutating disk, gear, or similar mechanism. By adding a second detector proximate the first detector the direction of rotation may be determined by the order in which the detectors are traversed; in particular if the magnet activates, at some point in the rotation, both detectors simultaneously, the direction of rotation may be determined by which detector was activated before both detectors were activated in a manner similar to a rotary (quadrature) encoder. In some embodiments a rotary encoder is used to determine angular position. In some embodiments the valve 803 is closed in response to a flow rate lower than a minimum threshold, a reverse flow is detected, or any other error condition. In some embodiments when irrigation of a target zone is completed the valve 803 is closed first, then the target zone valve is closed to drain the pressure in backflow preventer output pipe 813. By sequencing the valves in this order the pressure at sensor 805 is reduced to a low value making the backflow preventer valve ready to test and open the next time irrigation is desired. When irrigation is to be activated the local zone valve is first opened, and pressure readings are compared with levels to trigger a BPE. If a BPE is not triggered (e.g. water main side pressure within range, outside pressure low and within range) valve 803 is opened and irrigation commences.

In some embodiments self-testing of backflow preventer 800 is achieved using processor 809 thereby avoiding the requirement for on-site inspection by trained personnel with specialized equipment. Self testing proceeds by first closing valve 803 and draining the irrigation water out of line 813 by opening at least one zone valve coupled between the line 813 and a zone. At this point the pressure at the output pressure sensor 805 should be 0 (gauge pressure). Next, valve 803 is opened, and the remote zone valves are closed; after equilibrium has been reached, the input and output pressure as measured by 801 and 805 should be the same—the water service pressure. Next, a zone is enabled and the pressure drop across the valve 803 is measured; the expected pressure drop should be known based on measured flow and the mechanical dimensions of valve 803. By measuring the zero and pressurized values of the pressure sensors and comparing the values between them self-testing of the pressure sensors is attained.

In some embodiments the main valve 803 or a zone valve is automatically disabled in response to an irrigation fault being detected (e.g. a BPE, leak, stuck valve). In some embodiments a message containing fault and/or diagnostic information is sent to an authorized user via the internet, the authorized user being provided an ability to act upon the data and enable or disable the irrigation system as desired.

In some embodiments an automated procurement-assistant uses information stored on a computer in conjunction with an irrigation monitor to allow remote ordering and debugging of irrigation issues without an on-site visit. An automated procurement-assistant ensures procurement of correct irrigation components that will fit the monitored system, thereby avoiding duplicate site visits or truck rolls by service personnel. Irrigation systems come in many different sizes and manufacturers, and many of the components are not interchangeable. For example, "½ inch" polyethylene drip line or distribution line comes in at least three sizes having different inside and outside diameters (I.D. and O.D. respectively): 0.52" I.D.×0.62" O.D., 0.600" I.D.× 0.700" O.D., and 0.615" I.D.×0.710" I.D. In some embodiments maintenance and/or repair of the irrigation system is eased by maintaining electronically a materials inventory, database, or list of the constituent components in the system that aids in identifying and sourcing replacement parts for the irrigation system. Examples of the type of information that may be stored in a materials inventory include one or more of: manufacturer, model number, size, diameter, length, quantity, zone, color, cost, valve type, tube size, emitter flow rate, or sprinkler model. The inventory may be entered at a time of installation when all the information about the materials inventory is readily available. In some embodiments a web interface is provided to enable purchase of replacement irrigation parts for the system in the event of an identified irrigation fault. For example, if the irrigation monitor identifies a bad distribution tube, the web interface may present an option to buy a replacement distribution tube using information from both the irrigation monitor that identifies the class of component that needs service (e.g. distribution tube) and from the materials inventory that identifies the particular model of component (e.g. 0.52" I.D.×0.62" O.D. tube). Purchase of components are authorized by a user. In some embodiments the procurement of replacement materials is performed autonomously without user involvement. In some embodiments monitoring of deployed systems is provided to a manufacturer of equipment to aid in determining failure rate of components, use cases, or any other appropriate piece of usage information.

In some embodiments communication between an irrigation controller and a remotely located irrigation valve is performed wirelessly. Wireless communication provides for the addition of an arbitrary number of valves and allows additional valves to be easily placed after the system has been installed without running additional wires. Wireless valve control allows expansion of an existing system, versus present irrigation controllers that have a finite number of screw terminals and/or relays. Wireless valve control avoids electrical complexity on the irrigation controller side where conventionally each channel has separate relays and terminals, and eliminates the need for unreliable connections at the remote valve. In some embodiments the communication must be able to propagate where irrigation valves are located under ground and there is poor direct RF communication through the air from the irrigation controller to the remote valve. In some embodiments power is provided local to the remote value for operation of the wireless interface and to open and close the valve. The power may be provided from a battery, a solar cell, a combination thereof (e.g. a rechargeable battery, charging circuit and solar cell located in a lid of an irrigation vault) or any other appropriate energy source. Wireless communication may use RF communication such as radio communication in the industrial, scientific, and medical (ISM)-bands; acoustic propagation through irrigation feed lines to the valve; electrical communication through the feed line to the valve; or any other appropriate wireless transduction mechanism. In some embodiments a wireless transducer 901 is located proximate the irrigation controller 903 and is coupled to the controller. When the controller is to open a valve the controller sends a wireless command to the remote valve 905, which receives the command and performs an action in response to the received wireless command allowing water to flow from the valve's input 907 to the irrigation load 909. In some embodiments bi-directional communication including an acknowledgement from the intended recipient of the message is used to provide an improved degree of communication reliability. In some embodiments bi-directional communication includes a message sent from a remote location to the controller, the message including a metric of an irrigation parameter such as soil moisture level, temperature at the valve, valve pressure, battery level, etc. In some embodiments the wireless command is sent repeatedly until an acknowledgment is received, the repeated transmissions sent on different channels or frequencies, different bit rates, or any other appropriate adjustment is made to provide a successful communication transaction. In some embodiments a first acoustic transducer (microphone, speaker, combination thereof) is located at a first location and a valve to be remotely controlled is located at a second location. Coupling between the two acoustic transducers is performed using the irrigation main or feed as a conduit for acoustic transmission. In some embodiments the irrigation main is filled with water, air, or a combination thereof. Coupling may be performed by mechanically clamping the acoustic transducer to the outside of an irrigation main or an acoustic sensor coupled through the irrigation main into the interior of the pipe. In some embodiments acoustic transmission of communication messages is performed using a coding technique such as amplitude-, frequency-, or phase-modulation of an orthogonal signaling-alphabet including, for example, one or more Gold codes. Using coding and orthogonal signaling provides an improved ability to detect small signals in the presence of large noise. Acoustic propagation through water is substantially less lossy than propagation through soil.

Figure 10:
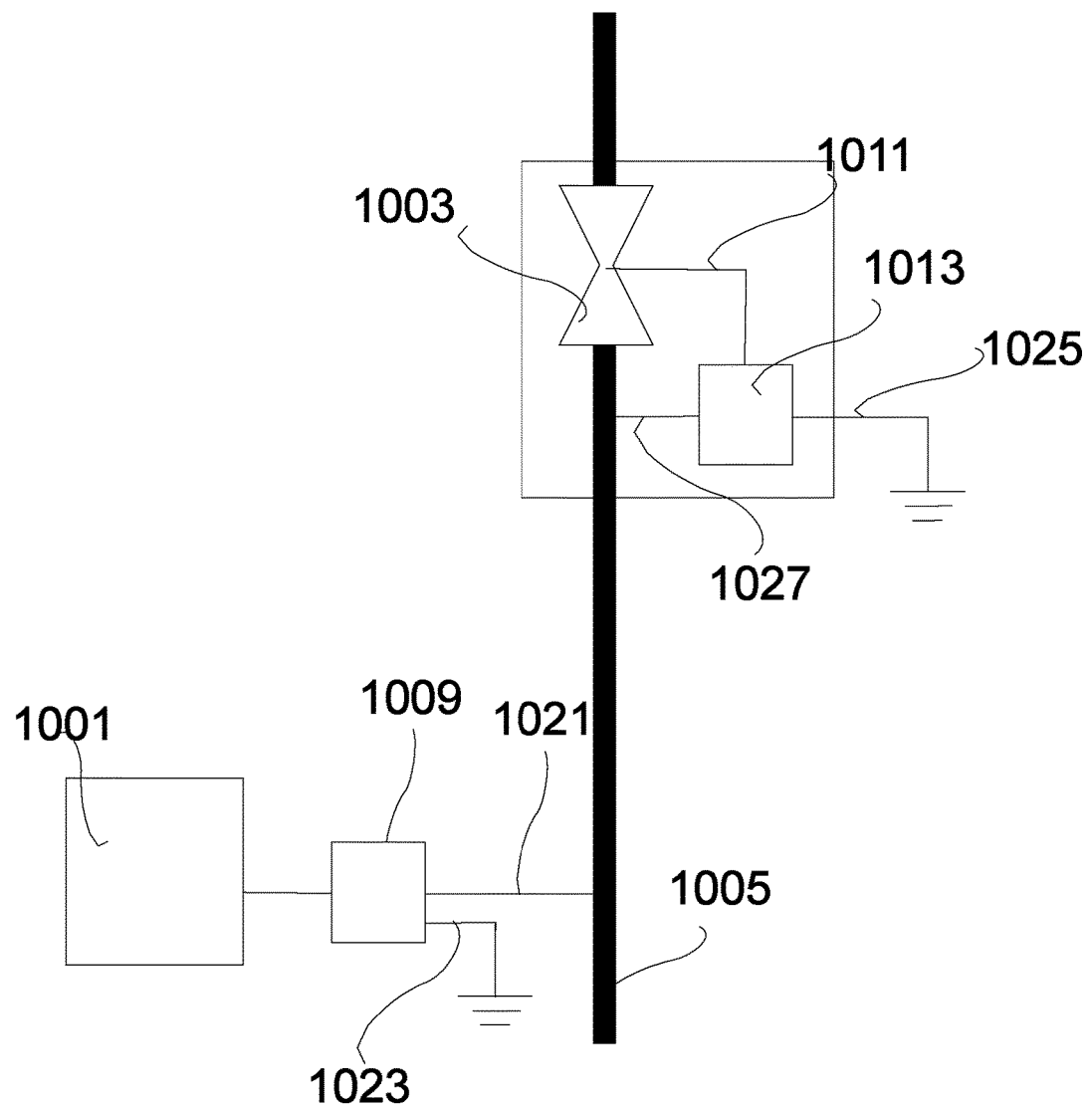
FIG. 10 illustrates a schematic diagram of another exemplary embodiment of a wirelessly-actuated irrigation valve.
Figure 11:
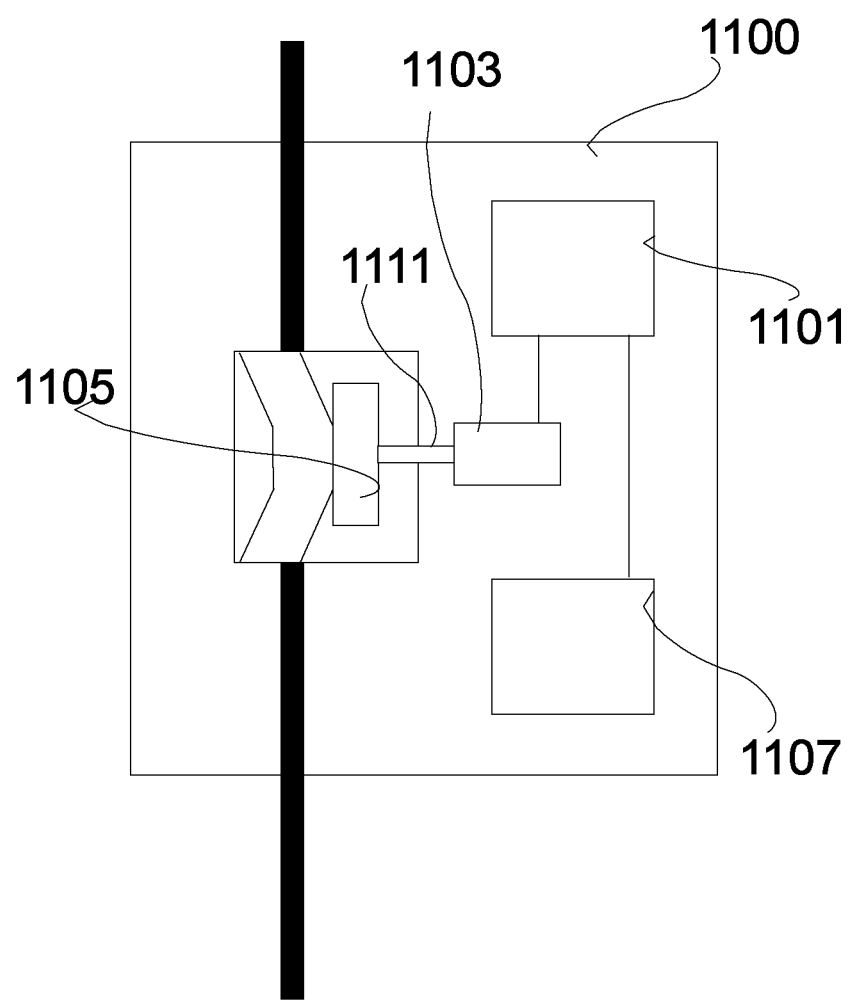
FIG. 11 illustrates a schematic diagram of an exemplary embodiment of a remotely-actuated irrigation valve.
Figure 12:
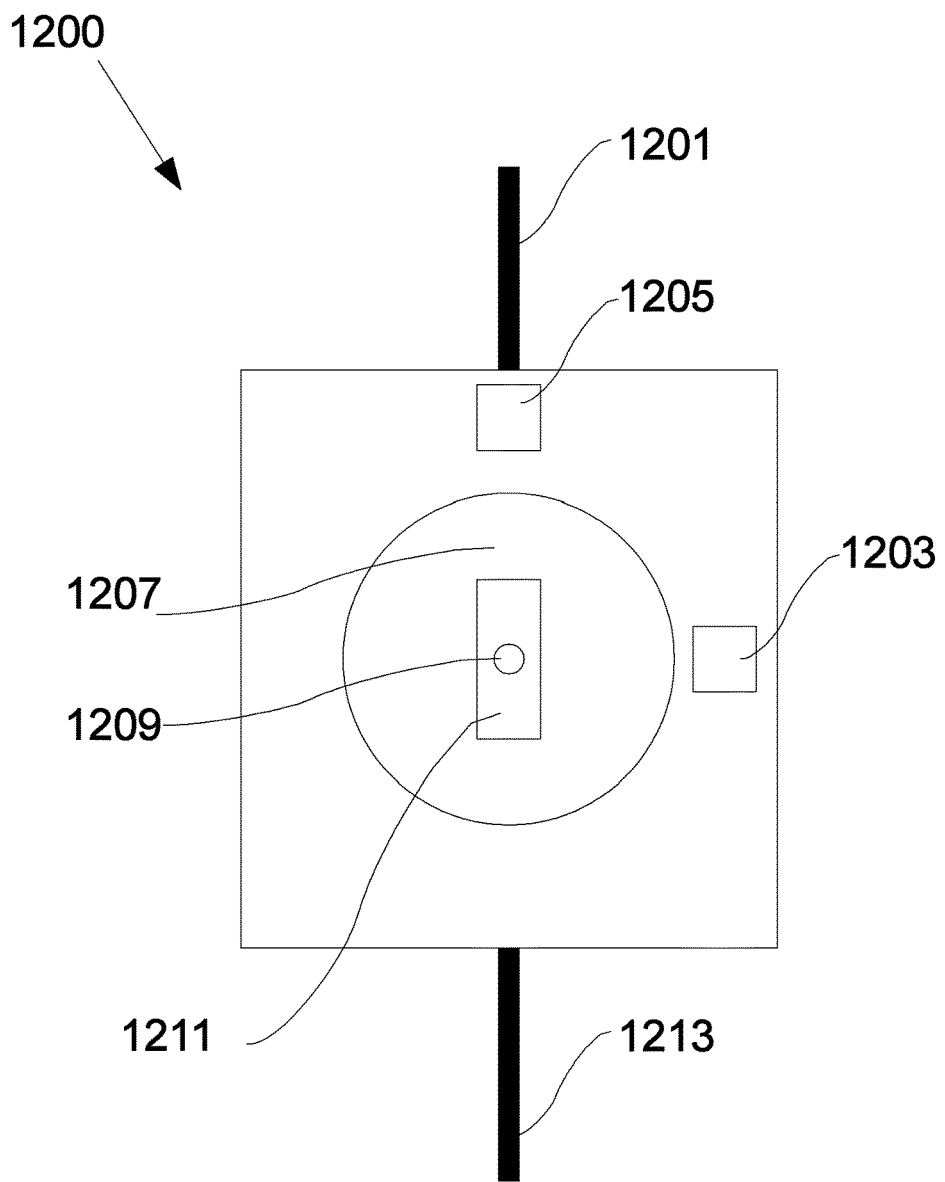
FIG. 12 illustrates a schematic diagram of an exemplary embodiment of a flow meter providing improved angular resolution as well as flow direction.

With reference to FIG. 10, in some embodiments wireless communication between an irrigation controller 1001 and a remote valve 1003 is performed using electrical signals communicated through the irrigation feed 1005 and the earth. Electrically-insulating pipe (e.g. PVC, ABS, polyethylene tubing, PEX tubing, etc.) is commonly used to distribute water in irrigation systems. Irrigation pipe 1005 provides electrical isolation between the earth and the water via the non-conductive tube wall; in this manner the water itself may be used as a first conductor with the earth being used as the second conductor. Two signaling wires 1021 and 1023 couple the irrigation controller 1001 to remote irrigation valve 1003 via signal conditioning circuitry 1009 (such as a radio transmitter, a digital-to-analog converter, a switched voltage source, a switched current source, or any other appropriate conditioning circuitry): wire 1021 is coupled through the water, inside the irrigation feed pipe, the other wire 1023 is coupled to earth. In some embodiments the earth coupling is performed using the ground terminal of a standard electrical socket that has been connected to the earth at a location remote from the electrical socket. In some embodiments the earth coupling is provided by driving a conductive stake into the earth and coupling the stake to the controller and is part of a grounding circuit of an existing electrical service. At the remote location the transmitted signal is detected by measuring an electrical parameter (ie. voltage, current) at the valve by coupling the first terminal of an electrical detector 1013 (such as a radio receiver, a voltage measurement circuit, an analog-to-digital converter, or any other appropriate electrical detector) having first and second inputs 1025, 1027 to the water inside of the pipe and earth. In some embodiments coupling 1027 is AC coupling and performed by capacitively coupling the first terminal of the electrical detector to the water through the dielectric of the irrigation pipe by placing a conductive material (e.g. metal foil, wire) proximate the pipe exterior. The second terminal of the electrical detector is coupled to an electrical node distinct from the first terminal. In some embodiments the second terminal 1025 is coupled to the earth, or ground, via a stake remotely located at the valve. In some embodiments the second terminal is coupled to a piece of metal that acts as a RF ground plane, thereby coupling the second terminal of the electrical detector to the earth without a direct, physical connection. In some embodiments the coupling at 1023 and 1021 comprises similar coupling technique or different coupling techniques.

In some embodiments a remotely controllable valve 1100 includes a microprocessor or microcontroller (e.g. processor) 1101, a latching solenoid 1103, a mechanical valve 1105 coupled to the solenoid 1103 via shaft 1111, and a power source 1107. A latching solenoid has two stable positions that, once forward-actuated, retain their state until reverse-actuated. Upon receiving an open command (e.g. wirelessly) the processor initiates a power-source measurement to determine a metric indicative of the remaining energy in source 1107 using a battery monitoring circuit local to the remotely controllable valve 1100 that measures at least one of an open circuit or a loaded circuit voltage or current. In some embodiments the battery monitoring circuit comprises an analog-to-digital converter configured to measure a voltage indicative of the energy remaining in 1107 (e.g. open-circuit battery voltage), the analog-to-digital converter being part of processor 1101. If the metric (e.g. voltage, an estimate of internal resistance) indicates sufficient energy remains available a pulse is applied to the solenoid in a first polarity to open the valve by processor 1101. In some embodiments the processor is coupled to a relay or transistor able to source an amount of current required to actuate the latching solenoid. After the valve has irrigated for a desired amount of time the valve is closed by energizing the solenoid in the reverse direction. The solenoid is coupled to the valve in a manner such that when the solenoid is in the on position water flows and water stops flowing in the off position; in some embodiments the solenoid is part of a diaphragm valve. Monitoring the power source before turning on the valve ensures that there will be sufficient energy to apply the required reverse pulse to turn off the valve, as latching solenoids retain state in a power-off condition.

In some embodiments each valve includes a unique identifier such as a media access control (MAC) ID. The MAC ID may be assigned at a time of manufacture by writing a nonvolatile memory, or through switches or headers at a time of installation. In addition to providing a characteristic useful for securing communications, inclusion of a MAC ID allows communication signals wirelessly communicated from the irrigation controller to be ignored when the message is received by a valve with a different MAC ID, and responded to if the MAC ID matches the MAC ID in the message thereby allowing directed communication on a shared communication line.

In some embodiments the remote valve detects the presence of water in the irrigation main line using a sensor at the remote valve (e.g. a continuity sensor). If no water is detected the remote irrigation valve opens, thereby allowing the irrigation pipe to be filled, enabling communication between the irrigation controller and the remote valve via water in the irrigation main line.

In some embodiments two or more magnetic field sensors 1203, 1205, such as hall-effect sensors, are used to determine an orientation of a magnet 1211 coupled to a rotating shaft 1209 further coupled to nutating disk 1207 in flow meter 1200 having first flow terminal 1201 and second flow terminal 1213. In some embodiments the flow measurement is made using a turbine or impeller as opposed to a nutating disk. Two or more magnetic field sensors, when oriented properly (e.g. orthogonal), are able to resolve the orientation of a magnet without phase ambiguities; the direction of rotation is easily derived by differentiating the orientation with respect to time. As the magnetic field sensors deviate from orthogonal sensing the resolving power of the combination is reduced. In some embodiments a magnetic compass, such as is used for mass-market consumer electronics such as cell phones provides a measurement of an angular position of a rotating shaft in a flow meter. In some embodiments the magnetic compass is placed inside a circle of rotation of the magnet (e.g. within a radius from the center of rotation) such that the magnetic compass indicates a full revolution for every full revolution of the magnet. For example, the integrated circuit LIS3MDL is an ultra-low-power high-performance three-axis magnetic sensor having a cost less than one dollar. By placing the sensor proximate the rotating magnet the shaft position may be measured in a contactless manner, Choosing a sensitive magnetic compass such as the LIS3MDL also provides for reduced cost of the magnet on the shaft as the required magnetic strength is reduced. Note that magnetic compasses will have DC bias offset due to orientation within earth's magnetic field as well as a DC bias and bias-drift from the electronics, and scale factor errors and drift that will cause inaccuracy unless addressed. The DC bias may be measured at a time of calibration by averaging the compass output over an entire revolution of the magnet. Drift of this quantity may be compensated for by long-term averaging the DC value of the compass output (e.g. axes) while flow is occurring and subtracting the DC bias from the compass output. Scale factor may similarly be calibrated and/or compensated in situ by determining a maximum and a minimum amplitude of a compass output, for example field strength along the x-axis and the y-axis as the shaft rotates. Orthogonally of the axes may be determined by measuring the phase between the two axes—conceptually this may be thought of as plotting Y vs. X, with different (X,Y) pairs of measurements over time completing the curve, which will result in an ellipse once sufficient data covering a full revolution is obtained with the angle of orientation being reflected by the X,Y coordinate of the ellipse. For example, when the X-axis doesn't change but the Y-axis slope is changing rapidly this suggests we are close to 0 degrees. The X-Y curve may be reconstructed mathematically and the angle of rotation determined using this relationship. An advantage of such a detection system is that resolution is improved over a pulse counting, and direction of flow is provided.

The embodiments, techniques, components, connections, and other teachings described herein are examples and were chosen to provide a clear explanation without unnecessary obfuscation. The scope of coverage is not intended to be limited to the specific exemplary teachings set forth herein, but rather the scope of coverage is set forth by the claims listed below.

I claim:

1. An irrigation system comprising:
 a combined irrigation monitor and controller comprising
  a processor having a first and a second output and a first input;
 a flow sensor coupled to the first input and an irrigation feed;
 a first valve, the first valve coupled to the first output, the irrigation feed, and a first irrigation zone;
 a second valve, the second valve coupled to the second output, the irrigation feed, and a second irrigation zone;
 wherein when the state of the first output is in a first state the processor quantifies flow through the flow sensor as a first amount of flow;
 wherein when the state of the second output is in a second state the processor quantifies flow through the flow sensor as a second amount of flow;
 wherein the first and second quantified flows are processed by the processor to produce data selected from the following list: detection of an unexpected flow condition in combination with an indicator of the zone responsible for the unexpected flow condition; a flow characteristic of the first zone; information about a fault condition including the zone in which the fault condition occurs; or, a report of irrigation system performance including the amount of water flow to the first zone.

2. The system of claim 1 wherein the coupling between the processor and the flow sensor is chosen from the list: electrical connection using wires; wireless connection.

3. The system of claim 1 further including at least one of the following: an impedance sensor coupled to a solenoid and the processor; a pressure sensor.

4. The system of claim 1 wherein the first output being in a first state corresponds to an assertion from the irrigation controller to open the first valve; and wherein the second output being in a second state corresponds to an assertion from the irrigation controller to open the second valve.

5. The system of claim 1 wherein a fault condition is determined based upon the flow sensor output, the first and second processor outputs, and a fault criterion;
 wherein an electronic communication is sent in response to a fault condition being determined.

6. The system of claim 5 wherein the fault criterion includes at least one of the following: a transient flow characteristic; a steady-state flow characteristic; a transient pressure characteristic; a steady-state pressure characteristic, a quantity of water.

7. The system of claim 5 wherein a fault condition is indicated in response to at least one of the following fault conditions: a stuck-open valve; a stuck-closed valve; a leaky-valve; a leak in an irrigation load; a leak in an irrigation feed; clogged emitters; a broken line; an electrical open; an electrical short; a bad solenoid; excess flow; insufficient flow; a mechanical fault; or an electrical fault.

8. The system of claim 1 wherein one of the following actions is performed in response to detecting a fault condition: providing identifying information about an irrigation system component; providing an interface to order an irrigation system component; sending an electronic communication to a user; receiving a communication from a user in response to an electronic communication to a user; performing an action in response to receiving a communication from a user in response to an electronic communication to a user; disabling the irrigation system; extending an irrigation time; sending a datagram.

9. The system of claim 1 further including sending a periodic report of irrigation system performance including at least one of: historical usage; current usage; typical usage for comparable irrigation systems; irrigation performance; or irrigation faults.

10. An irrigation system comprising:
 an irrigation monitor comprising a first processor having a first input;
 an irrigation controller comprising a second processor, a first output, and a second output, the second processor being coupled to the first processor;
 a flow sensor coupled to the first input and an irrigation feed;
 a first valve, the first valve coupled to the first output, the irrigation feed, and a first irrigation zone;
 a second valve, the second valve coupled to the second output, the irrigation feed, and a second irrigation zone;
 wherein when the state of the first output is in a first state at least one of the first or the second processor quantifies flow through the flow sensor as a first amount of flow;
 wherein when the state of the second output is in a second state at least one of the first or the second processor quantifies flow through the flow sensor as a second amount of flow;
 wherein the first and second quantified flows are processed by at least one of the first or the second processor to produce data selected from the following list: detection of an unexpected flow condition in combination with an indicator of the zone responsible for the unexpected flow condition; a flow characteristic of the first zone; information about a fault condition including the zone in which the fault condition occurs; or, irrigation system performance including the amount of water flow to the first zone.

11. The system of claim 10 wherein the first output being in a first state corresponds to an assertion from the irrigation controller to open the first valve; and wherein the second output being in a second state corresponds to an assertion from the irrigation controller to open the second valve.

12. The system of claim 10 wherein the coupling between the first input and the flow sensor is chosen from the list: electrical connection using wires; wireless connection.

13. The system of claim 10 further including at least one of the following: an impedance sensor coupled to a solenoid and the processor; a pressure sensor.

14. The system of claim 10 further including sending a periodic report of irrigation system performance including at least one of: historical usage; current usage; typical usage for comparable irrigation systems; irrigation performance; or irrigation faults.

15. A method for monitoring an irrigation system comprising steps for:
   measuring flow through an irrigation feed using a flow sensor;
   determining an intended state of at least a first irrigation valve and a second irrigation valve, the valves being coupled to first and second zones;
   associating the measured flow with an intended valve state;
   wherein when the intended state of the first irrigation valve is in a first state flow through the flow sensor is associated with a first amount of flow;
   wherein when the intended state of the second irrigation valve is in a second state flow through the flow sensor is associated with a second amount of flow;
   wherein the first and second amount of flow are processed to produce data selected from the following list: detection of an unexpected flow condition in combination with an indicator of the zone responsible for the unexpected flow condition; a flow characteristic of the first zone; information about a fault condition including the zone in which the fault condition occurs; or, a report of irrigation system performance including the amount of water flow to the first zone.

16. The system of claim 15 wherein the intended state of the first irrigation valve being in a first state corresponds to an assertion from the irrigation controller to open the first valve; and, wherein the intended state of the second irrigation valve being in a second state corresponds to an assertion from the irrigation controller to open the second valve.

17. The method of claim 15 wherein the step of associating the measured flow with an intended valve state comprises transferring information using at least one selected from the following list: an electrical circuit coupled to a solenoid; a semaphore; a variable; or, a coupling provided through software.

18. The method of claim 15 wherein when the intended state of the first irrigation valve is open and the intended state of the second irrigation valve is closed then the step of associating the measured flow with an intended valve state comprises apportioning the entire flow to the first valve; and, wherein the first amount of flow is this apportionment.

19. The method of claim 15 wherein the flow characteristic of the first zone comprises data including at least one of a transient flow versus time, a transient pressure versus time, a steady-state flow, a steady-state pressure.

20. The method of claim 15 further including sending a periodic report of irrigation system performance including at least one of: historical usage; current usage; typical usage for comparable irrigation systems; irrigation performance; or irrigation faults.

\* \* \* \* \*